United States Patent [19]
Howe et al.

[11] Patent Number: 5,236,755
[45] Date of Patent: Aug. 17, 1993

[54] OPTICAL RECORDING ELEMENTS

[75] Inventors: Steven D. Howe, Suffolk; Lynn Y. Dorey, Essex, both of England

[73] Assignee: Imperial Chemical Industries PLC, London, England

[21] Appl. No.: 736,573

[22] Filed: Jul. 26, 1991

[30] Foreign Application Priority Data

Aug. 7, 1990 [GB] United Kingdom ............... 9017266

[51] Int. Cl.$^5$ ............................................. B32B 3/00
[52] U.S. Cl. ......................................... 428/64; 428/65; 428/457; 428/913; 430/270; 430/945; 346/76 L; 346/135.1; 369/283; 369/288
[58] Field of Search ............... 428/64, 65, 457, 913; 346/76 L, 135.1; 369/283, 288; 430/270, 945

[56] References Cited

U.S. PATENT DOCUMENTS

| | | | |
|---|---|---|---|
| 4,195,312 | 3/1980 | Bell et al. | 346/76 L |
| 4,305,081 | 12/1981 | Spong | 346/135.1 |
| 4,940,618 | 7/1990 | Hamada et al. | 428/64 |

FOREIGN PATENT DOCUMENTS

| | | | |
|---|---|---|---|
| 0100995 | 2/1984 | European Pat. Off. | 428/64 |
| 60-243836 | 12/1985 | Japan | 428/64 |
| 62-188046 | 8/1987 | Japan | 428/64 |
| 2148148A | 5/1985 | United Kingdom | 428/64 |

OTHER PUBLICATIONS

Bell, et al., "Antireflection Structures for Optical Recording", IEEE Journal of Quantum Electronics, vol. QE-14, No. 7, Jul. 1978, pp. 487-495.

Primary Examiner—Patrick J. Ryan
Assistant Examiner—Elizabeth Evans
Attorney, Agent, or Firm—Cushman, Darby & Cushman

[57] ABSTRACT

An optical recording element has a recording layer (18) protected by an overcoat layer (20) which is transmissive to laser radiation used for writing pits in the recording layer (18). The thickness of the overcoat layer (20) is selected to be less that the conventional ¼ wavelength thickness and the recording layer thickness is selected, in conjunction with the overcoat layer thickness in such a way that the minimum value of reflectivity on the reflectivity-v-thickness curve is depressed.

10 Claims, 1 Drawing Sheet

OPTICAL RECORDING ELEMENTS

BACKGROUND OF THE INVENTION

1. Field of the Invention

This invention relates to laser beam recordable optical recording media of the type including a radiation absorbing layer superimposed on a reflecting layer, and in which the thickness of the absorbing layer is selected so that the reflectance of the media is proximate a maximum on the reflectance versus thickness curve for the media. The invention is particularly concerned with optical recording media of this type in which an overcoat layer is provided, the overcoat layer being transmissive with respect to laser radiation of a given wavelength at which recording is intended to be effected.

2. Description of the Prior Art

It is known to use transmissive overcoats having a thickness equal to the so-called half wavelength thickness $t_{\frac{1}{2}}$ as defined hereinbelow so that the overcoat is virtually invisible to laser radiation of said given wavelength.

SUMMARY OF THE INVENTION

According to one aspect of the present invention there is provided an optical recording element, for use with a laser recording beam having a given wavelength, comprising:

a substrate;

a first layer which is highly reflective with respect to radiation of said given wavelength;

a second layer for absorbing radiation of said given wavelength; and a third layer forming an overcoat layer of the element; characterised in that:

(i) the overall reflectivity of the recording element has a predetermined value which, on the reflectivity-v-thickness curve for the recording element corresponding to said given wavelength, lies (a) proximate the second reflectivity maximum $R_{max}$ and (b) between the first reflectivity minimum $R_{min}$ and $R_{max}$;

(ii) the thickness of the overcoat layer is less than the "half wavelength" thickness $t_{\frac{1}{2}}$ (as herein defined); and (iii) the thicknesses of the absorbing and overcoat layers are such that the value of $R_{min}$ is less than the value of the half wavelength thickness $R_{min}(\frac{1}{2})$ attainable with an otherwise identical recording element which has (a) an overcoat layer equal to the half wavelength thickness and (b) a recording layer thickness producing, in combination with the overcoat layer, an overall reflectivity of said predetermined value.

Preferably the thicknesses of the absorbing and overcoat layers are such that the value of $R_{min}$ is less than the value of the half wavelength thickness $R_{min}(\frac{1}{2})$ by a factor of at least about 25% of the difference between $R_{min}(\frac{1}{2})$ and the lowest value of $R_{min}(1)$ attainable by varying the thicknesses of the absorbing and overcoat layers while maintaining the overall reflectivity of the recording element constant.

More preferably said factor is at least about 40% of said difference and in the most preferred embodiments of the invention, said factor is at least 65% of said difference.

We have found that, whilst the use of an overcoat thickness less than the half wavelength thickness means that the overcoat is not invisible with respect to the incident radiation, certain advantages can be derived which can more than compensate for this. In particular, the use of a reduced thickness overcoat layer renders the recording element more sensitive if the criteria defined hereinabove are adopted while achieving good CNR (carrier to noise ratio). In addition jitter, which is a measure of pit reproducibility, can be reduced. The term "jitter" is defined in for example "The Complete Handbook of Magnetic Recording" by F. Jorgensen, 3rd edition (see Glossary), published by TAB Professional and Reference Books.

As used herein, the "half wavelength" thickness $t_{\frac{1}{2}}$ is equal to the thickness determined by the formula:

$$t_{\frac{1}{2}} = \text{lambda}/2n$$

where lambda is said given wavelength and n is the refractive index of the overcoat layer.

The optical recording element may take any of the various forms used in the art; for example, it may be in the form of an optical disc (either of the rigid type of the floppy type) or in the form of a tape medium or card medium.

Preferably the absorbing layer is of the type which is thermally deformed to form optically readable pits when subject to heating by laser radiation of said given wavelength.

According to a second aspect of the present invention there is provided a method for optically writing an optical recording element, comprising scanning an optical recording element, as defined in said one aspect of the invention, with a laser beam having said given wavelength, and modulating the intensity of the laser beam to form a plurality of pits in the absorbing layer such that the depth of the pits is equal to a value which confers the pits with a reflectivity less than $R_{min}(\frac{1}{2})$.

According to a third aspect of the present invention there is provided apparatus for the optical writing of optically detectable information, said apparatus comprising:

a recording element as defined in accordance with said one aspect of the invention;

means for scanning the recording element with a laser beam of said given wavelength;

means for modulating the intensity of the laser beam during scanning thereof over the recording element such that the latter is formed with discrete pits having a depth equal to a value which confers the pits with a reflectivity $R_{min}$ less than $R_{min}(\frac{1}{2})$.

Preferably, the pits are written to a depth such that the reflectivity $R_{min}$ conferred is less than $R_{min}(\frac{1}{2})$ by a factor which is at least about 25% of the difference between $R_{min}(\frac{1}{2})$ and $R_{min}(1)$. More preferably said factor is at least about 40% of said difference and in the most preferred embodiments of the invention, said factor is at least about 65% of said difference.

According to a further aspect of the invention there is provided an optical recording element in accordance with said one aspect of the invention, said element having written in the absorbing layer thereof a plurality of optically detectable pits having a reflectivity less than $R_{min}(\frac{1}{2})$.

In preferred embodiments of the invention, the recording element includes tracking formations which define zones in which information is intended to be recorded and which enable the laser beam to be maintained in registry with such zones during recording and reading of the optical element. Such zones may be at a different level with respect to the surrounding areas of the recording element to allow said zones to be optically distinguished from the remaining areas. In this event, the thickness of the overcoat layer will vary according to whether it is measured in the region of the zones or the remaining areas. It is therefore to be understood that the references above to the thickness of the overcoat and absorbing layers refer to the zones in which information is to be recorded or has been recorded.

For example, the tracking formations may, as is common practice in the art, be constituted either by a series of generally concentric grooves or a spiral groove with lands between the grooves or groove convolutions. The information to be recorded may be written either into the grooved zones of the element or the lands. Both possibilities are applicable to the present invention and, if for instance, the recording element of the invention is used to record information in the land areas, the overcoat and absorbing layer thicknesses in these regions will be selected according to the criteria defined above.

Preferably the absorbing layer of an optical recording element of the present invention has optical constants such that the real part of the refractive index lies within the range 2.0 to 3.0 (more preferably 2.3 to 2.5) and the imaginary part of the refractive index lies within the range of 0.1 to 1.5 (more preferably 0.1 to 0.4).

The reflectance of the recording element in the zones, prior to writing therein, is preferably in the range of 30 to 55%, more preferably 30% to 40%.

$R_{min}$ is preferably no greater than about 20%, more preferably no greater than about 15%.

Preferably, the difference between $R_{max}$ and $R_{min}$ is at least about 25%, more preferably at least about 30%.

Preferably the overcoat layer comprises a material which is substantially transmissive with respect to radiation of said given wavelength and may comprise a suitable inorganic material or a radiation curable organic material. Where the overcoat is an inorganic material, it may comprise a suitable oxide such as a silicon or titanium oxide. Where an organic material is employed, it may comprise an ultra violet or electron beam curable urethane acrylate, epoxy acrylate or polyester acrylate.

BRIEF DESCRIPTION OF THE DRAWINGS

The invention will now be described by way of example only with reference to the accompanying drawings in which.

DETAILED DESCRIPTION OF THE PRESENTLY PREFERRED EXEMPLARY EMBODIMENTS

Figure 1:
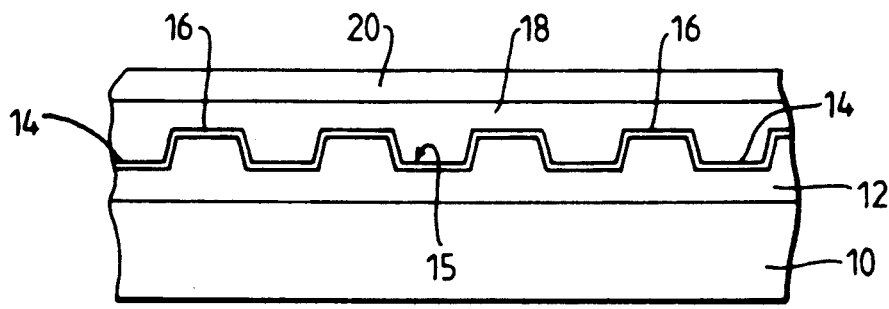
FIG. 1 is a schematic view in cross-section of an optical recording element to which the present invention is applicable.

Referring to FIG. 1, the optical recording medium illustrated is in a form suitable for use as a flexible optical disc. However, it will be appreciated that the present invention is not limited to media of the optical disc type. The medium comprises a flexible substrate 10 which is coated with a subbing or smoothing layer 12. The subbing layer 12 is pre-formatted, i.e. embossed with grooves 14, the groove bases or the lands 16 between the grooves having pits embossed therein for providing servo information, addresses etc. The grooves 14 also aid tracking during writing and reading of the medium by laser beam. A thin layer 15 of material, e.g. a suitable metal, is applied to the pre-formatted surface of the subbing layer 12 to provide a surface which is highly reflective with respect to the wavelength used for writing into and reading from the medium. The contour of the layer 15 will generally follow that of the underlying subbing layer 12.

An amorphous absorbing layer 18 of a dye combined with a thermoplastic binder is solvent coated over the reflecting layer 15. A number of suitable dyes for use in the absorbing layer 18 are disclosed in our prior U.S. Pat. No. 4,606,859. The binder is typically an amorphous polyester thermoplastic resin. A protective overcoat layer 20 is superimposed on the absorbing layer 18, the overcoat layer being of a material which is substantially transmissive to the laser radiation used for writing and reading the medium an which will protect the absorbing layer from damage by for example abrasion and/or chemical attack. The substrate 10 may comprise for example a 75 micron or less thick film of Melinex which is a biaxially orientated polyethylene teraphthalate film (Melinex is a Registered Trade Mark of Imperial Chemical Industries PLC) and has sufficient flexibility to function, when coated with the layers 12, 15, 18 and 20, as a floppy disc in terms of drive characteristics when used in a floppy disc drive such as the Bernoulli type disclosed in UK Patent Application No. 2216710 filed in the names of Imperial Chemical Industries PLC and Bernoulli Optical Systems Company. The dye is selected so as to have an absorption peak slightly shifted away from the reading and writing wavelength, typically 830 nm.

Figure 2:
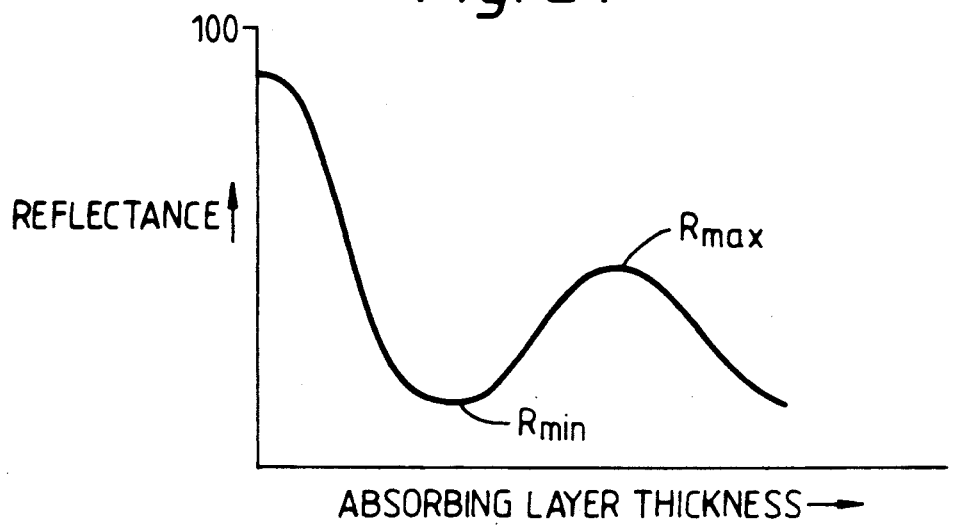
FIG. 2 is a graph showing the relationship between the reflectance of the recording element and the thickness of the absorbing layer.

The dye-binder layer exhibits a non-linear reflectance-v-thickness curve (see FIG. 2). The data pits may be recorded into the regions corresponding to the grooves 14 or the lands 16 between the grooves. Depending on which regions are used (bases or lands), the thickness of the dye-binder absorbing layer 18 is selected so that the layer thickness in those regions where pits are recorded correspond generally to the point on the reflectance-v-thickness curve proximate the second reflectance maximum $R_{max}$. If, for example, the pits are to be written into the lands 16, the thickness of the absorbing layer 18 in the regions above the lands will be selected so as to be proximate $R_{max}$. Typically, the reflectivity of the optical structure at the operating wavelength is of the order of 35% or more.

According to conventional thinking, it is desirable that the overcoat should have a thickness corresponding to the half wavelength thickness (as hereinbefore defined) so that the protective layer is virtually transparent to the laser radiation used for reading and writing the element. However, we have found it advantageous to adopt a reduced thickness for the overcoat since the sensitivity of the recording element can be enhanced while maintaining good CNR. Reducing overcoat thickness in itself is not necessarily advantageous because any departure from the half wavelength thickness inevitably reduces the $R_{max}$ of the recording element which, in turn, influences sensitivity. In accordance with the invention, not only is the overcoat thickness reduced but the absorbing layer thickness is also selected in order to offset the detrimental affect that reduction of overcoat thickness could otherwise bring about.

In order to illustrate the invention, suppose that it is desired to produce an optical recording element having an unwritten reflectance of 40%. If a half wavelength thickness overcoat is used, the 40% reflectance of the recording element can be achieved by appropriate selection of the absorbing layer thickness. Such a recording element will have a well-defined reflectance-v-thickness curve. In particular, it will have a well-defined $R_{min}$. If the same recording element structure is now modified by using a reduced thickness overcoat, which will reduce $R_{max}$ of the recording element, it is possible to restore the reflectance of the structure to 40% by adjustment of the thickness of the absorbing layer. The effect of such adjustment will be to alter the value of $R_{min}$ for the modified structure. This is illustrated by FIG. 3 which shows the variation of $R_{min}$ with variation in the thickness of the overcoat in circumstances where the changes in overcoat thickness have been compensated by adjustment of the absorbing layer thickness to maintain an unwritten reflectance of 40%.

Figure 3:
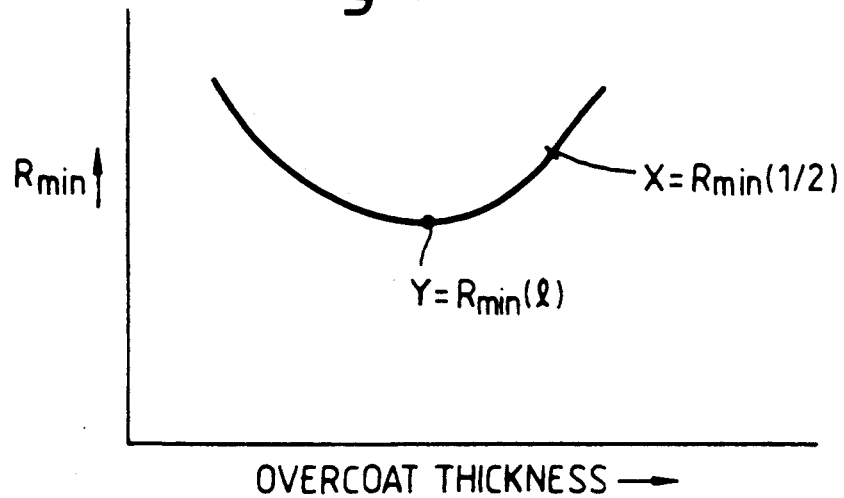
FIG. 3 is a graph illustrating variation of $R_{min}$ with overcoat thickness for a recording element having a constant overall reflectance.

The point X on the curve of FIG. 3 depicts the case where the overcoat thickness is equal to the half wavelength thickness. It will be seen that, by modifying the absorbing layer thickness to maintain a reflectance of 40%, over a range of overcoat thicknesses, the value of $R_{min}$ is less than the value of $R_{min}$ corresponding to the half wavelength thickness overcoat. The point Y on the curve of FIG. 3 depicts the case where $R_{min}$ is at its lowest value $R_{min}(1)$ achievable for that particular recording element by varying the overcoat thickness and the absorbing layer thickness while maintaining the unwritten reflectance constant. It will understood that if the value of $R_{min}$ is reduced, the reduction in $R_{max}$ resulting from the presence of an overcoat not having a half wavelength thickness is at least partly compensated for. Thus, in accordance with the invention, in producing a recording element of a given reflectance, in addition to reducing the overcoat thickness, the absorbing layer thickness is selected so that the value of $R_{min}$ is less than the value corresponding to the half wavelength thickness. Most preferably, the absorbing layer thickness is selected so that $R_{min}(1)$ is attained. However, it is envisaged that significant advantages will accrue if $R_{min}$ is greater than $R_{min}(1)$ but less than the value of $R_{min}$ corresponding to the half wavelength overcoat thickness.

EXAMPLE

An optical recording medium having a reflectivity of 40% for use in conjunction with a laser source of 830 nm wavelength was fabricated by spin coating a dye binder formulation on to a reflective substrate. The substrate comprised a polyethylene terephthalate (Melinex—Registered Trade Mark of Imperial Chemicals Industries PLC) coated with an aluminium alloy of thickness of the order of 50 nm. The optical constants of the reflective aluminium alloy layer were: $n=2.74$ and $k=8.32$. The dye comprised pentadeca (naphth-2-ylthio) copper phthalocyanine, the preparation of which is disclosed in Example 33 of our prior U.S. Pat. No. 4,606,859, and the binder comprised VYLON 103 which is a commercially available saturated polyester resin. The proportion of dye to binder in the formulation was 3:1. The optical constants for the resulting dye binder layer were: $n=2.3$ and $k=0.21$.

An overcoat layer transmissive to radiation of 830 nm wavelength was spin coated on to the dye binder layer, the overcoat material comprising an epoxy acrylate having a refractive index of 1.5. It will be understood that a lambda/2n overcoat in these circumstances would be about 277 nm thick (i.e. $830 \div (2 \times 1.5)$). However, in accordance with the invention the overcoat was coated to a thickness of 245 nm and, in order to obtain a reflectivity $R_{start}$ of 40%, the dye binder layer was coated to a thickness of 135 nm.

The resulting media had an $R_{max}$ of 54% and $R_{min}$ of 8% which is close to the minimum reflectivity achievable by variation of the overcoat and dye binder layer thicknesses. The media was found to have a CNR of about 50 dB and exhibited good sensitivity in that formation of pits with a depth corresponding to $R_{min}$ could be achieved with a laser energy of 2nJ per bit.

We claim:

1. An optical recording element, for use with a laser recording beam having a given wavelength, comprising:
    a substrate;
    a first layer which is highly reflective with respect to radiation of said given wavelength;
    a second layer for absorbing radiation of said given wavelength; and
    a third layer forming an overcoat layer of the element; wherein:
    (i) the overall reflectivity of the recording element has a predetermined value which, on the reflectivity-v-thickness curve for the recording element corresponding to said given wavelength, lies (a) proximate the second reflectivity maximum $R_{max}$ and (b) between the first reflectivity minimum $R_{min}$ and $R_{max}$;
    (ii) the thickness of the overcoat layer is less than the "half wavelength" thickness $t_{\frac{1}{2}}$ wherein $t_{\frac{1}{2}}$ equals lambda/2n wherein lambda is said given wavelength and n is the refractive index of the overcoat layer; and
    (iii) the thicknesses of the absorbing and overcoat layers are such that the value of $R_{min}$ is less than the value of the half wavelength thickness $R_{min}(\frac{1}{2})$ attainable with an otherwise identical recording element which has (a) an overcoat layer equal to the half wavelength thickness and (b) a recording layer thickness producing, in combination with the overcoat layer, an overall reflectivity of said predetermined value.

2. An element as claimed in claim 1 in which the thicknesses of the absorbing and overcoat layers are such that the value of $R_{min}$ is less than the value of the half wavelength thickness $R_{min}(\frac{1}{2})$ by a factor of at least about 25% of the difference between $R_{min}(\frac{1}{2})$ and the lowest value of $R_{min}(1)$ attainable by varying the thicknesses of the absorbing and overcoat layers while maintaining the overall reflectivity of the recording element constant.

3. An element as claimed in claim 2 in which said factor is at least about 40% of said difference.

4. An element as claimed in claim 2 in which said factor is at least 65% of said difference.

5. An element as claimed in claims 1, 2, 3, or 4 in which the element is in the form of a tape.

6. An element as claimed in any one of claims 1 to 4, wherein the absorbing layer is of the type which is thermally deformed to form optically readable pits when subject to heating by laser radiation of said given wavelength.

7. An optical recording element as claimed in any one of claims 1 to 4, said element having written in the absorbing layer thereof a plurality of optically detectable pits having a reflectivity less than $R_{min}(\frac{1}{2})$.

8. A method for optically writing an optical recording element, comprising:
   providing an optical recording element according to any one of claims 1 to 4,
   scanning said optical recording element with a laser beam having said given wavelength, and
   modulating the intensity of the laser beam to form a plurality of pits in the absorbing layer such that the depth of the pits is equal to a value which confers the pits with a reflectivity less than $R_{min}(\frac{1}{2})$.

9. An element as claimed in claim 8 in which the pits are written to a depth such that the reflectivity $R_{min}$ conferred is less than $R_{min}(\frac{1}{2})$ by a factor which is at least about 25% of the difference between $R_{min}(\frac{1}{2})$ and $R_{min}(1)$.

10. Apparatus for the optical writing of optically detectable information, said apparatus comprising:
   a recording element as claimed in any one of claims 1-4;
   means for scanning the recording element with a laser beam of said given wavelength;
   means for modulating the intensity of the laser beam during scanning thereof over the recording element such that the latter is formed with discrete pits having a depth equal to a value which confers the pits with a reflectivity $R_{min}$ less than $R_{min}(\frac{1}{2})$.

* * * * *